July 9, 1968  J. SANTANDREA, JR., ET AL  3,391,601
IMAGE PROJECTING SYSTEM
Filed Oct. 22, 1965  3 Sheets-Sheet 1

INVENTORS,
JAMES SANTANDREA, JR.,
CARMINE SANTANDREA
BY
ATTORNEY

July 9, 1968   J. SANTANDREA, JR., ET AL   3,391,601
IMAGE PROJECTING SYSTEM
Filed Oct. 22, 1965   3 Sheets-Sheet 2
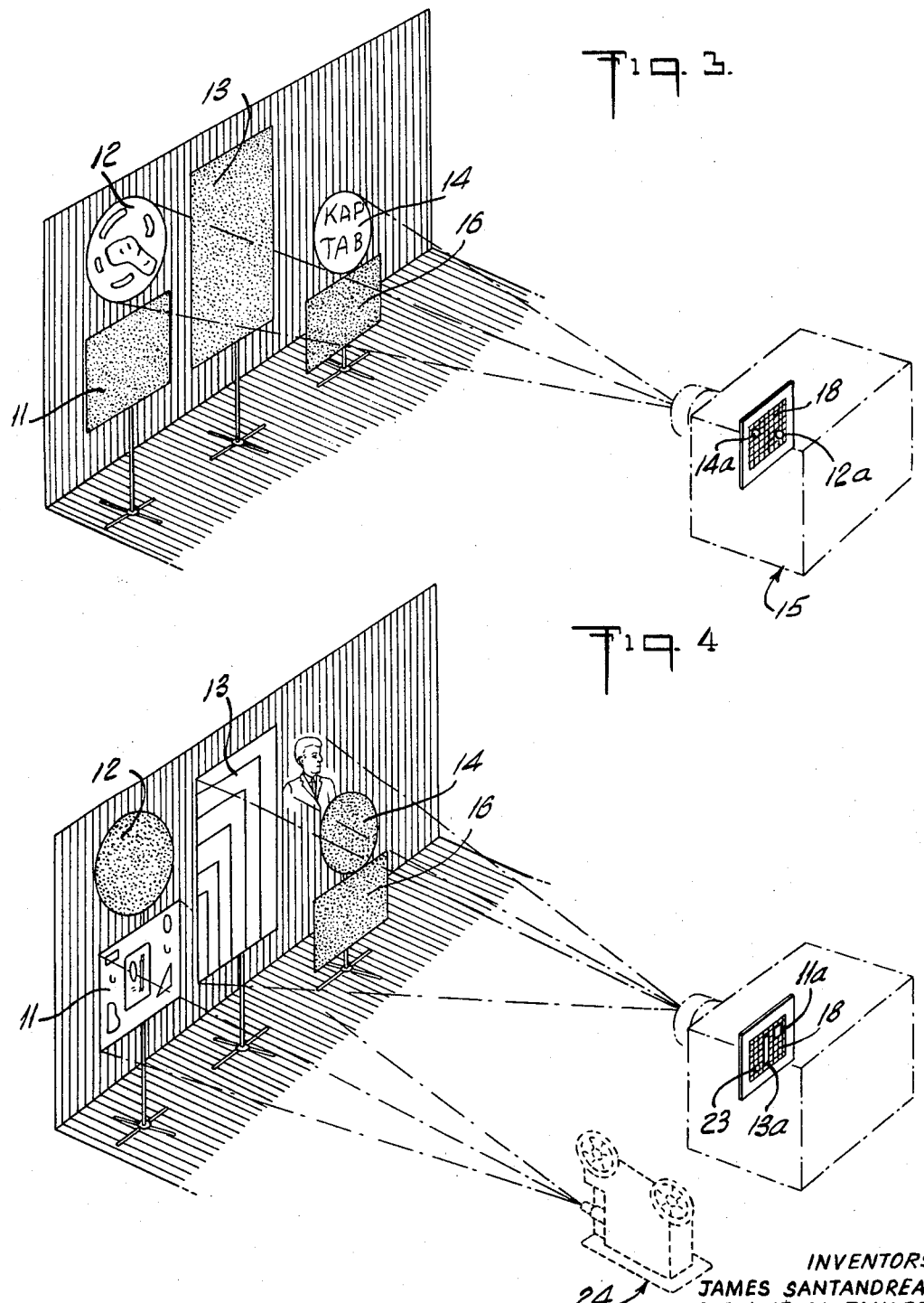
INVENTORS,
JAMES SANTANDREA, JR.,
CARMINE SANTANDREA
BY
ATTORNEY

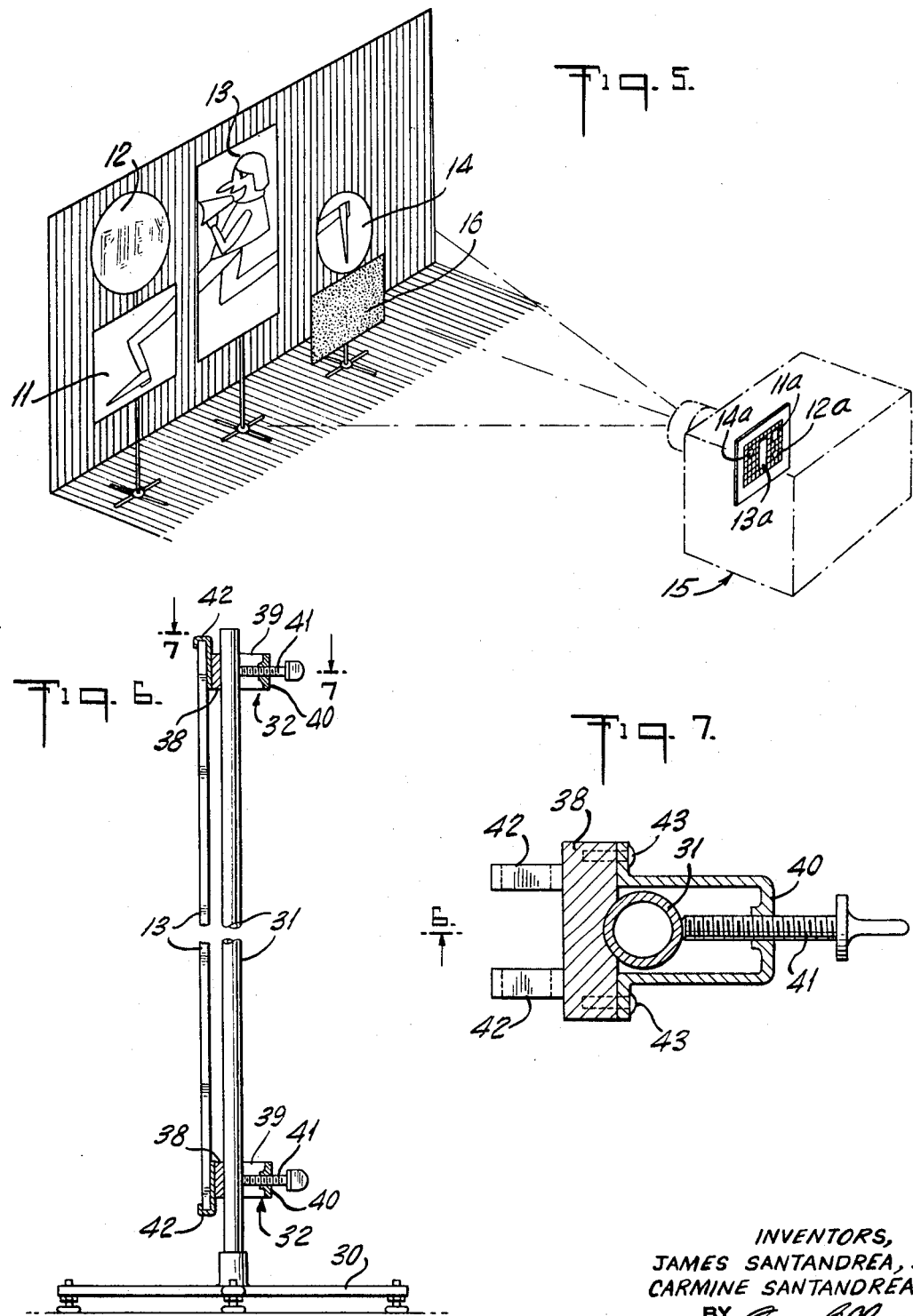

3,391,601
IMAGE PROJECTING SYSTEM
James Santandrea, Jr., 201 E. 15th St., New York, N.Y. 10003, and Carmine Santandrea, 37—31 149th St., Flushing, N.Y. 11354
Filed Oct. 22, 1965, Ser. No. 501,955
2 Claims. (Cl. 88—24)

ABSTRACT OF THE DISCLOSURE

An image projecting system for the projection of slides and film strips onto a plurality of individual screens. The frames of each slide or film strip are arranged with one or more openings coordinated in size and configuration with the corresponding screens so that successive frames, when projected, will form images on certain or all of the screens while maintaining minimum illumination in areas between screens.

---

This invention relates to image projecting systems and more specifically to a novel and improved method and apparatus for the projection of images from a single projector onto a plurality of screens grouped in a predetermined manner so that images may be projected on one or more of the screens as may be desired.

While this invention is useful in a wide variety of applications, it is particularly useful in connection with advertising programs for conveying information to personnel groups such as salesmen and the like, since the utilization of a plurality of individual screens with a coordinated group of slides to project images on selected screens forms an unusual and dramatic display procedure which avoids monotonous repetition and thereby holds one's attention and interest for extended periods.

The foregoing object of the invention is attained by the utilization of photographic slides or motion picture film wherein each slide or frame is opaque except for discrete transparent, image carrying areas aligned with the physical position a plurality of screens so that light projected through the transparent areas will illuminate selected screens. The screens of any particular group may be of similar or varied shapes, and accordingly, each light transmitting area of each photographic slide or frame is shaped to illuminate the particular screen coordinated therewith.

When this invention is utilized with photographic slides, it is also possible to employ a motion picture projector in addition to the slide projector so that motion pictures can be displayed for instance on one while still images are projected on other of the screens.

Another object of the invention resides in the provision of a novel and improved projector system characterized by the utilization of a plurality of independent screens arranged in a selected configuration and a plurality of image carrying transparent slides or frames coordinated with the screens for illuminating one or more of the screens as may be desired.

Another object of the invention resides in the provision for a novel and improved apparatus for the projection and visual display of images.

In many instances and particularly in connection with advertising displays, it is often desireable to direct the attention of the audience on an object or upon a speaker who may be utilizing the projection system for illustration or emphasis of ideas he desires to impart to the audience. These ends can be achieved with this invention by the provision of transparent areas on the photographic slides to spotlight either the speaker or material objects such as merchandise and the like which may be positioned in the vicinity of the screens. With the utilization of the slides for producing spotlighting effects as well as the display of images on the screens, auxiliary spotlight equipment is eliminated, and by proper arrangement of the slides the attention of the audience can be controlled to achieve a desired result. For instance the attention of the audience can be directed solely on the speaker or on a spotlighted object. In cases where the images displayed are of importance, the speaker would not be spolighted in order to concentrate the attention of the audience solely on the screens. Furthermore by illuminating screen combinations and periodically lighting the speaker or objects of merchandise, monotonous repetition is avoided and the interest of the audience is maintained.

The above and other objects of the invention will become more apparent from the following description and accompanying drawings forming part of this application.

In the drawings:

FIGURE 3 is a perspective view of the invention similar to FIGURES 1 and 2, showing two of the screens illuminated.

FIGURE 4 is a perspective view of a modified form of the invention shown in the preceding figures.

FIGURE 5 is a perspective view of the invention illustrating the visual effect produced when utilizing all screens to display a single image.

FIGURE 6 is a side elevational view of one of the screen supports shown in FIGURES 1 through 5.

FIGURE 7 is a cross sectional view of FIGURE 6 taken along the line 7—7 thereof.

The projection system in accordance with the invention provides a novel and improved mode of display of images by which unusual and dramatic effects can be produced which will attract and hold the attention of an audience. The invention not only provides for the display of images on selected screens or a group of screens but may also be used for spotlighting objects or a lecturer addressing an audience while simultaneously displaying images. Each of the screens which forms a group can be of any desired shape or configuration provided however that the cooperating slides be coordinated with the screens in the manner hereinafter described. For instance in the use of the invention to advertise the sale of automobiles, it would be possible to have one or more of the screens simulating the outline of the automobile and the image carrying areas of the slides which illuminate such screen would have the same configuration. In this way, the screen would be completely illuminated without illuminating the adjoining screens or objects such as background walls or the like. Thus the invention provides for a wide variety of visual effects which when utilized in an imaginative manner will gain and hold the attention of the audience and thereby greatly facilitate effective communication.

Figure 1:
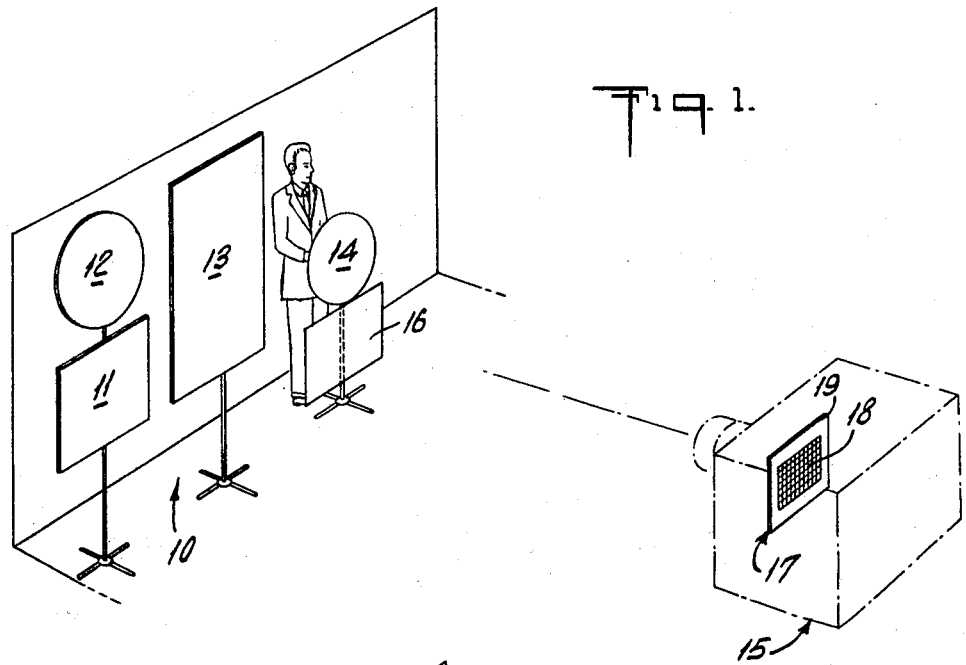
FIGURE 1 is a perspective view of one embodiment of the invention with the slide projector being shown in diagrammatic form.

Referring now to the drawings and more specifically to FIGURE 1, the numeral 10 generally denotes an arrangement of individual screens 11, 12, 13, and 14 on which images are projected by a suitable slide projector 15. The screens 12 through 14 may be arranged in any suitable manner, and each screen may have any desired shape or configuration. In the illustrated form of the invention, the screens 12 and 14 are circularly shaped, the screen 11 is square, and the screen 13 rectangularly shaped. It is understood of course that screens of other shapes may be employed and arranged in any suitable configuration. The rectangular panel 16 which is disposed immediately beneath the screen 14 is principally intended to conceal the lower portion of a person standing behind the screen 14 who may be delivering a commentary to accompany the display of the images on the screen. The board 16 may also be utilized for the display of items which, as will be shown, can be spotlighted by the projector. Similarly, the head and shoulders of the speaker can be spotlighted when he desires the attention of the audience.

Figure 2:
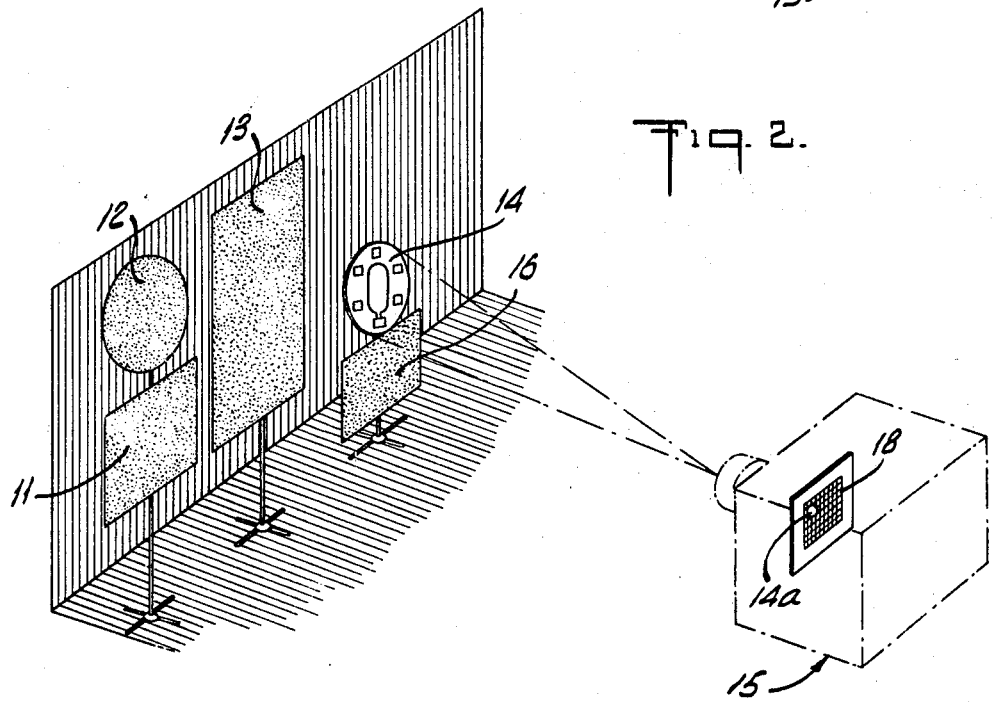
FIGURE 2 is a perspective view similar to FIGURE 1 illustrating the cooperation of a slide with a selected screen.

The slides 17 for use with the screen arrangement 10 are coordinated with the screens so that one or more of the screens 11 through 14 can be illuminated by separate image carrying beams. The slides 17 each comprise a piece of photographic film 18 supported by a suitable carrier 19 in the conventional manner. The film 18 is completely opaque except for selected areas which are to correspond with one or more of the screens 11 through 14. This feature is illustrated more clearly in FIGURE 2 wherein the film 18 is provided with a light transmitting image carrying area 14a positioned on the film 18 to precisely illuminate the screen 14. Since projection is preferably conducted in a darkened room, the other screens 11 through 13 would not be readily visible to the viewer because of the high contrast between the illuminated screen and the surrounding area. By forming a pair of image carrying transparent areas such as the areas 12a and 14a, as shown in FIGURE 3, the screens 12 and 14 would be illuminated. Similar procedures would be utilized for illumination of the screens 11 and 13 as illustrated more clearly in FIGURE 4. In this figure the screen 13 is illuminated by the image carrying light transmitting area 13a on the film 18, and at the same time a wholly transparent area 23 may be utilized to spotlight the head and shoulders of the speaker. Similarly, another transparent opening similar to the opening 23 could be utilized to spotlight the panel 16 or to spotlight any other object placed in front or in the vicinity of the screens. It is evident that by properly positioning the openings on the film 18, the light passing through such openings will be directed at predetermined angles relative to the projector, it being merely necessary to have a sufficiently wide angle lens to accomplish the desired ends.

The invention further comprehends the utilization of a second projector such as a motion picture projector 24 as shown in FIGURE 4, which can be directed on one of the screens such as the screen 11. In this case the operator would coordinate the operation of the two projectors so that while the projector 15 may be illuminating one or more of the screens 12 through 14, the projector 24 could be illuminating the screen 11. Thus screen 11 may be illuminated by either projector.

While the screens 11 through 14 may be individually illuminated by image carrying beams, the utilization of all of the screens to display a single image or picture provides a most interesting and unusual effect. This feature is shown in FIGURE 5 in which the caricature of a man is displayed. It will be observed that the body of the man is projected onto the screen 13 while the screen 11 displays one foot and a portion of the leg, and the screen 14 displays the other foot and portion of the leg. The screen 12 carries a message spoken by the projected figure. Thus while the image being displayed is separated into discrete portions, it nevertheless provides a single coordinated image in the mind of the viewer. This form of presentation stimulates the imagination of the viewer in that it requires coordination of the independent portions of the image to form a unified image. In this way a more lasting impression is made on the viewer, which is the basic objective of the art of communication.

While the screens 11 through 14 may be supported in any desired manner, one convenient mode of support is illustrated in FIGURES 6 and 7. More specifically the support shown in FIGURE 6 comprises a suitable base 30 and an upright member 31 secured to the base. A screen such as the screen 13 is secured to the upright member 31 by a pair of clamps generally denoted by the numeral 32 and shown more clearly in FIGURE 7. Each clamp includes a base member 38 having a U-shaped element 39 secured to the base by screws 40 or other suitable fasteners. The transverse element 40 of the U-shaped element 39 threadably receives a screw 41 which is used to secure the clamp 32 to the upright 31 in the desired position. The base 38 of the clamp further includes a pair of U-shaped brackets 42 which engage an edge of the screen 13. In this way any size screen can be secured to the upright 31 in any desired position.

The embodiment of the invention described above utilizes photographic or other image carrying slides for the display of images and spotlighting the speaker or an object of merchandise or the like. It is of course apparent that a motion picture film may be similarly employed with each frame arranged with image carrying areas coordinated with the screens. Such film when projected by a suitable motion picture projector would not only achieve the ends attained with an individual slide but would also enable the display of motion picture images on one or more of the screens without the need for an auxiliary projector.

While only certain embodiments of the invention have been illustrated and described, it is apparent that alterations, modifications and changes may be made without departing from the true scope and spirit thereof as defined by the appended claims.

What is claimed is:

1. Image projection and display apparatus comprising an image projector means including a light source, projecting lens and means for receiving an image carrying element to be projected, a plurality of individual image display screens having selected configurations and arranged in a selected spaced relationship one relative to the others and to said projector, a plurality of image carrying elements each having discrete image carrying areas with the image carrying areas of each element constituting less than the total area of said element and the remaining area of said element being opaque, each image carrying area of each of said elements being precisely coordinated in size and configuration with one of said image display screens so that each image carrying area of each element when the latter is inserted in said projector will precisely illuminate the total area of its coordinated screen while the areas between the screen remain substantially unilluminated whereby the images projected on selected screens by certain elements may be independent of the images on other screens and images projected by other elements may be discrete portions of a single image, said apparatus further including a second image projector means to project selectively images onto at least one of said individual screens.

2. Image projection apparatus according to claim 1 wherein at least certain of said elements each include a transparent area for the projection of a light beam on an area adjoining said screens to illuminate an object positioned in the last said area.

References Cited

UNITED STATES PATENTS

| 1,646,855 | 10/1927 | Del Riccio | 88—24 |
| 2,682,117 | 6/1954 | Wales | 88—24 |
| 3,104,273 | 9/1963 | Ballance | 88—24 |
| 3,309,163 | 3/1967 | White | 88—24 |

NORTON ANSHER, *Primary Examiner.*

R. M. SHEER, *Assistant Examiner.*